United States Patent
Wang et al.

(10) Patent No.: US 8,836,650 B2
(45) Date of Patent: Sep. 16, 2014

(54) TOUCH-SENSING DISPLAY DEVICE

(75) Inventors: Wen-Chun Wang, Taichung (TW);
Chih-Chang Lai, Tai Chung County (TW); Ting-Yu Chang, Feng Shan (TW); Chin-Chang Liu, Taichung County (TW)

(73) Assignee: Wintek Corporation, Taichung (TW)

( * ) Notice: Subject to any disclaimer, the term of this patent is extended or adjusted under 35 U.S.C. 154(b) by 633 days.

(21) Appl. No.: 13/006,121

(22) Filed: Jan. 13, 2011

(65) Prior Publication Data

US 2011/0169759 A1    Jul. 14, 2011

(30) Foreign Application Priority Data

Jan. 14, 2010 (TW) ................. 09100866 A
Apr. 2, 2010  (TW) ................. 09110273 A (51) Int. Cl.
*G06F 3/041* (2006.01)

(52) U.S. Cl.
CPC .... *G06F 3/0416* (2013.01); *G06F 2203/04103* (2013.01); *G06F 2203/04107* (2013.01); *G06F 1/13338* (2013.01)
USPC .......................................... 345/173; 345/178

(58) Field of Classification Search
CPC ................... G06F 3/0416; G06F 2203/04103; G06F 2203/04107
USPC .............. 345/156–179; 178/18.01–18.03; 174/254; 347/50
See application file for complete search history.

(56) References Cited

U.S. PATENT DOCUMENTS

| | | | |
|---|---|---|---|
| 5,420,620 A * | 5/1995 | Tamura | 347/50 |
| 5,657,139 A * | 8/1997 | Hayashi | 349/40 |
| 7,158,124 B2 | 1/2007 | Nakajima | |
| 8,378,975 B2 * | 2/2013 | Yoon et al. | 345/173 |
| 8,427,446 B2 * | 4/2013 | Lan et al. | 345/173 |
| 2002/0089492 A1 | 7/2002 | Ahn et al. | |
| 2005/0253773 A1 * | 11/2005 | Sekiguchi | 345/1.1 |
| 2006/0238503 A1 * | 10/2006 | Smith et al. | 345/156 |
| 2008/0158175 A1 * | 7/2008 | Hotelling et al. | 345/173 |
| 2008/0158178 A1 * | 7/2008 | Hotelling et al. | 345/173 |
| 2009/0184937 A1 * | 7/2009 | Grivna | 345/173 |
| 2009/0283300 A1 | 11/2009 | Grunthaner | |
| 2009/0284484 A1 * | 11/2009 | Hwang et al. | 345/173 |
| 2009/0289885 A1 * | 11/2009 | Chao | 345/98 |
| 2010/0085326 A1 * | 4/2010 | Anno | 345/174 |
| 2010/0110040 A1 * | 5/2010 | Kim et al. | 345/174 |
| 2010/0110041 A1 * | 5/2010 | Jang | 345/174 |
| 2010/0163394 A1 * | 7/2010 | Tang et al. | 200/600 |
| 2010/0214247 A1 * | 8/2010 | Tang et al. | 345/173 |
| 2011/0095999 A1 * | 4/2011 | Hayton | 345/173 |
| 2011/0141042 A1 * | 6/2011 | Kim et al. | 345/173 |

FOREIGN PATENT DOCUMENTS

| | | |
|---|---|---|
| CN | 1851534 | 10/2006 |
| TW | I256869 B | 6/2006 |
| TW | 200928901 A | 7/2009 |
| TW | 200949639 A | 12/2009 |

* cited by examiner

*Primary Examiner* — Prabodh M Dharia
(74) *Attorney, Agent, or Firm* — Muncy, Geissler, Olds & Lowes, P.C.

(57) ABSTRACT

A touch-sensing display device includes a display panel, a touch panel, a driver unit, and a flexible printed circuit board. The touch panel is disposed on the display panel, and the driver unit is disposed on the display panel to provide driving signals and drive the display panel and the touch panel. The flexible printed circuit board connects the display panel to a system main board.

13 Claims, 8 Drawing Sheets

TOUCH-SENSING DISPLAY DEVICE

BACKGROUND OF THE INVENTION a. Field of the Invention

The invention relates to a touch-sensing display device.

b. Description of the Related Art

Figure 1:
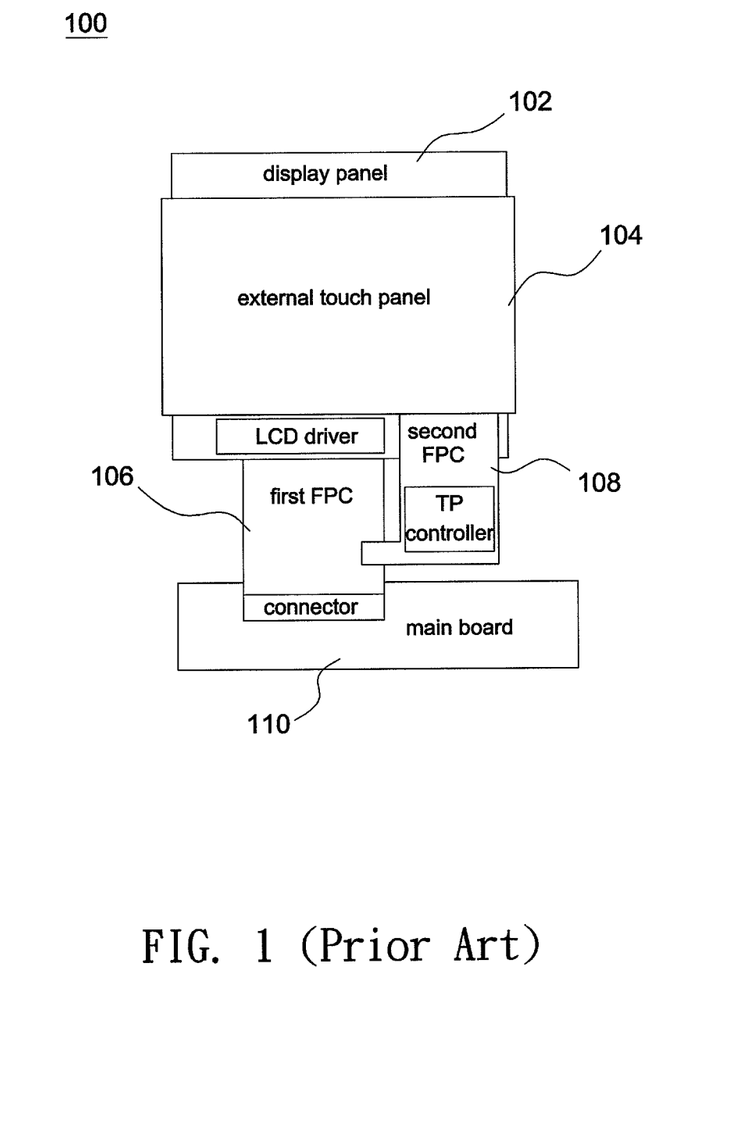
FIG. 1 shows a schematic diagram of a conventional touch-sensing display device according to the prior art.
Figure 2:
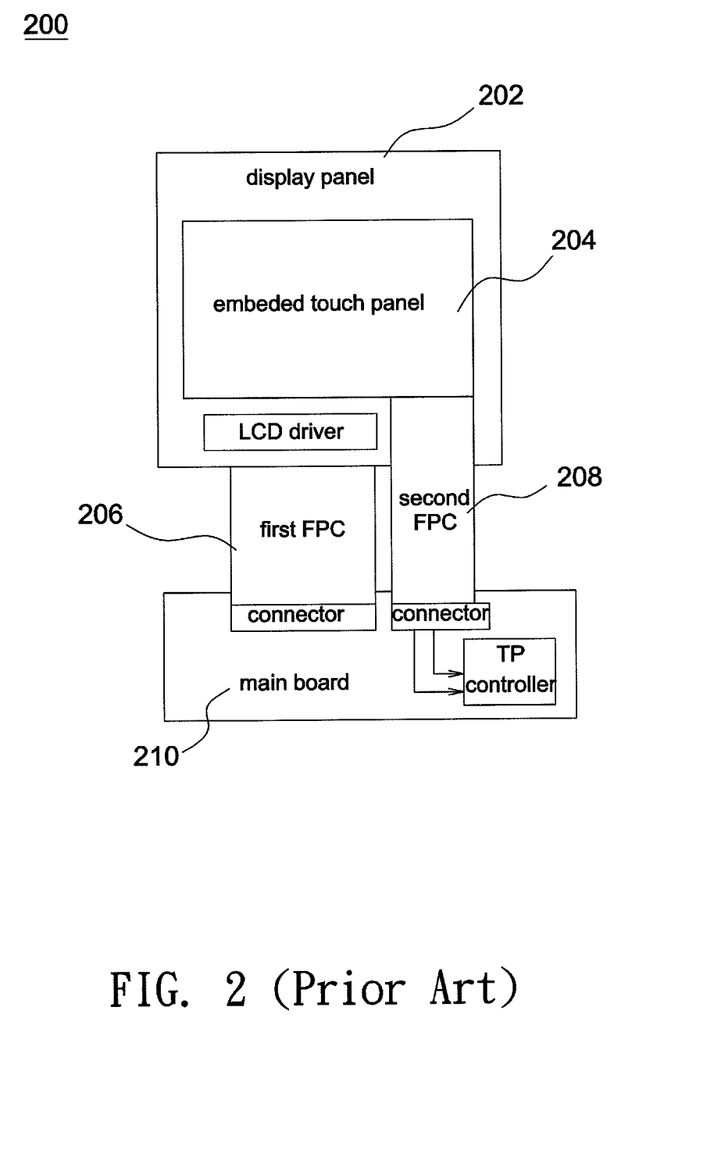
FIG. 2 shows a schematic diagram of another conventional touch-sensing display device according to the prior art.

FIG. 1 shows a schematic diagram of a conventional touch-sensing display device 100. As shown in FIG. 1, an external touch panel 104 is attached to a display panel 102, and a display panel driver IC (LCD driver) of the touch-sensing display device 100 and a touch panel driver IC (touch panel controller) are separated from each other. Thus, two flexible printed circuit boards (FPC) are needed, where a first flexible printed circuit board 106 connects the signals between the LCD driver and the system main board 110 and a second flexible printed circuit board 108 connects the routing of the touch panel 104 and the touch panel controller and further connects them to the first flexible printed circuit board 106. FIG. 2 shows another conventional touch-sensing display device 200. As shown in FIG. 2, an embedded touch panel 204 is directly integrated into a display panel 202, and the display panel driver IC (LCD driver) and the touch panel driver IC (touch panel controller) are separated from each other. Thus, similarly, two flexible printed circuit boards (FPC) are needed, where a first flexible printed circuit board 206 connects the signals between the LCD driver and the system main board 210 and a second flexible printed circuit board 208 connects the routing of the touch panel 204 and the signal lines of the system main board 210.

Therefore, according to the conventional designs, two flexible printed circuit boards are needed to combine with a display panel driver IC and a touch panel driver IC separate from each to therefore decrease the production yield and increase fabrication costs. Thus, the routing design of a single driver IC that has the function of driving both a display panel and a touch panel is needed to reduce signal noises and layout areas.

BRIEF SUMMARY OF THE INVENTION

The invention provides a touch-sensing display device having reduced signal noises and layout areas.

According to an embodiment of the invention, a touch-sensing display device includes a display panel, a touch panel, a driver unit, and a flexible printed circuit board. The touch panel is disposed on the display panel, and the driver unit is disposed on the display panel to provide driving signals and drive the display panel and the touch panel. The flexible printed circuit board connects the display panel to a system main board.

According to another embodiment of the invention, a touch-sensing display device includes a display panel, a touch panel, a driver unit, a first flexible printed circuit board and a second flexible printed circuit board. The driver unit is disposed on the display panel and provides driving signals to drive the display panel and the touch panel. The first flexible printed circuit board is electrically connected to the driver unit and connects the display panel to a system main board through a first connector. The second flexible printed circuit board connects the touch panel to the first flexible printed circuit board.

According another embodiment of the invention, a touch-sensing display device includes a display panel, a cover glass, a touch panel, a driver unit, a first flexible printed circuit board and a second flexible printed circuit board. The cover glass is disposed on one side of the display panel, and the touch panel is formed on the cover glass. The driver unit is disposed on the display panel and provides driving signals to drive the display panel and the touch panel. The first flexible printed circuit board connects the display panel to a system main board through a connector, and the second flexible printed circuit board connects the touch panel to the display panel.

In one embodiment, the driver unit includes at least one first pad block with a first function and at least one second pad block with a second function, the second function is different to the first function, and the pad distribution or the pad arrangement of the first pad block is different to the pad distribution or the pad arrangement of the second pad block.

In one embodiment, the driver unit includes at least one first pad block with a first function and at least one second pad block with a second function, the second function is different to the first function, the first pad block comprises a plurality of first pads, the second pad block comprises a plurality of second pads, a pitch between two adjacent first pads is different to the distance between the first pad block and the second pad block, and a pitch between two adjacent second pads is different to the distance between the first pad block and the second pad block.

In one embodiment, the driver unit includes at least one first pad block with a first function and at least one second pad block with a second function, the second function is different to the first function, the first pad block comprises a plurality of first pads, the second pad block comprises a plurality of second pads, and a pitch between two adjacent first pads, a pitch between two adjacent second pads and the distance between the first pad block and the second pad block are different from each other.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF THE INVENTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 3A:
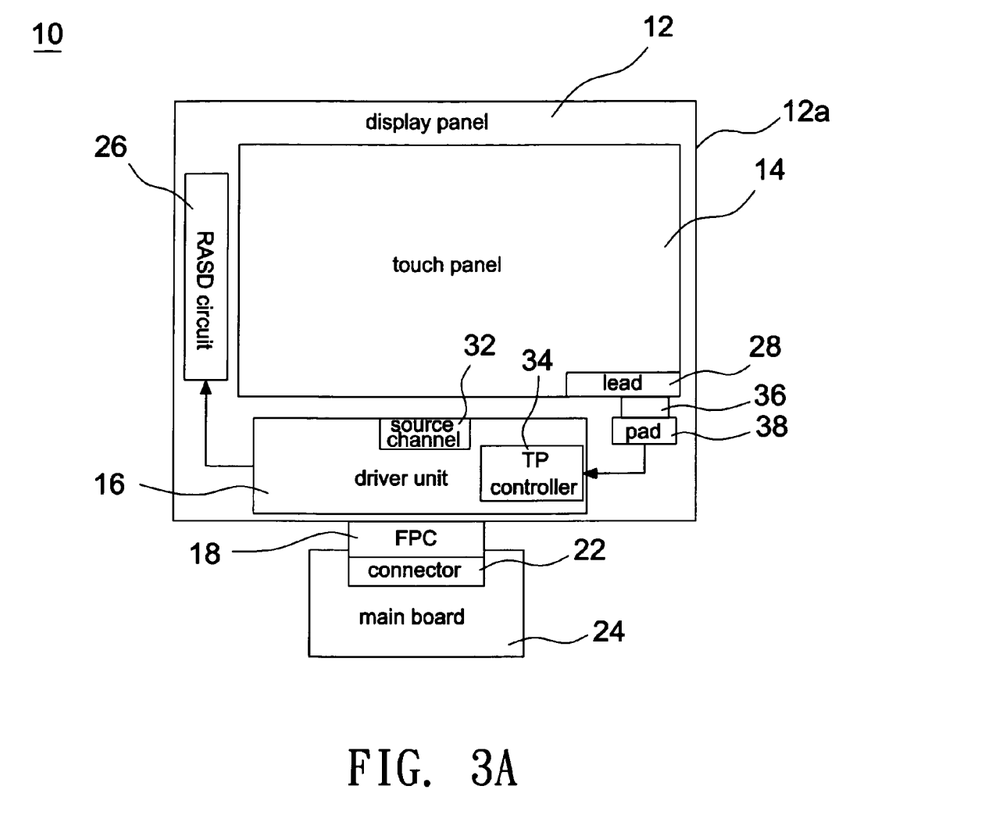
FIG. 3A shows a schematic diagram illustrating a touch-sensing display device according to an embodiment of the invention and FIG. 3B shows a partial cross-sectional schematic diagram of FIG. 3A.
Figure 3B:
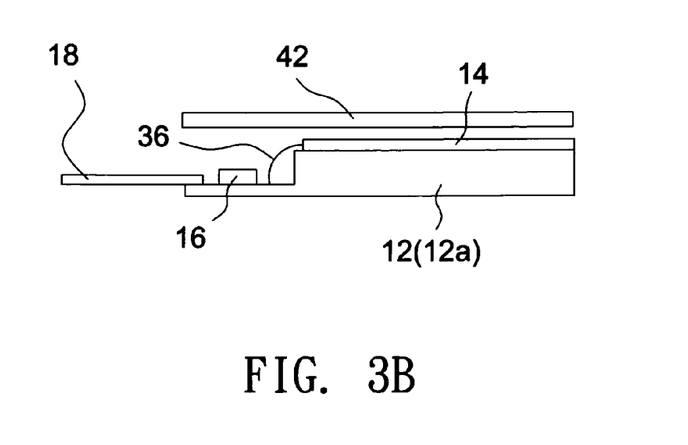

FIG. 3A shows a touch-sensing display device 10 according to an embodiment of the invention, and FIG. 3B shows a partial cross-sectional schematic diagram of FIG. 3A. As shown in FIG. 3A, the touch-sensing display device 10 includes a display panel 12, a touch panel 14, a driver unit 16, and a flexible printed circuit board (FPC) 18. The touch panel 14 is disposed on the display panel 12, and the driver unit 16 is disposed on the display panel 12 to provide driving signals for driving the display panel 12 and the touch panel 14. The flexible printed circuit board 18 connects the display panel 12 to a system main board 24. Specifically, the flexible printed circuit board 18 may connect the display panel 12 to a connector 22, and the connector 22 is connected to a system main board 24. In this embodiment, the gate driver (RASD circuit 26 shown in FIG. 3A) of the display panel 12 is embedded in a bottom glass 12a of the display panel 12, and the driver unit 16 is, for example, a single driver IC with a touch-sensing function. The driver unit 16 provides driving signals to drive the display panel 12 and the touch panel 14 and includes a source channel 32, a touch panel (TP) controller 34, and control lines of the gate driver. As shown in FIG. 3B, the touch panel 14 is embedded in the display panel 12, and signal lines of the touch panel 14 are connected to a pad 38 on the bottom glass 12a of the display panel 12 through an outer lead 28 and silver paste 36. The pad 38 is interconnected with the driver unit 16, and a cover glass 42 covers the touch panel 14.

In this embodiment, signal lines of the touch panel 14 are directly connected to the driver unit 16 having a touch-sensing function on the bottom glass 12a of the display panel 12. Therefore, only one flexible printed circuit board, one connector, and one IC are needed to thereby increase the production yield and reduce fabrication costs, signal noises and layout areas.

Figure 4A:
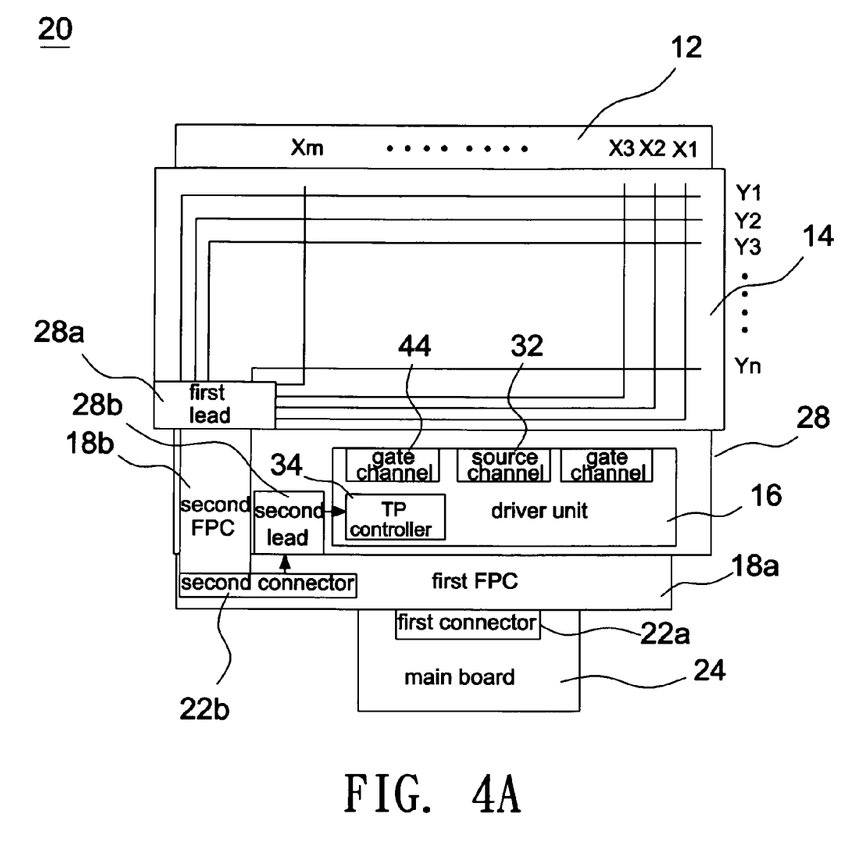
FIG. 4A shows a schematic diagram illustrating a touch-sensing display device according to another embodiment of the invention and FIG. 4B shows a partial cross-sectional schematic diagram of FIG. 4A.
Figure 4B:
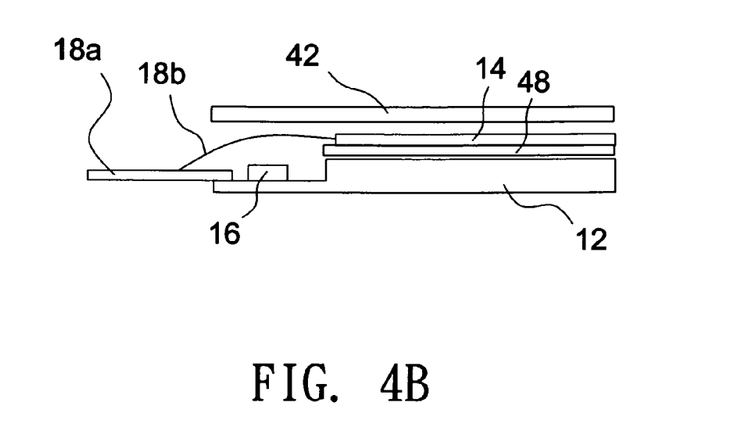

FIG. 4A shows a schematic diagram illustrating a touch-sensing display device 20 according to another embodiment of the invention. FIG. 4B shows a partial cross-sectional schematic diagram of FIG. 4A. As shown in FIGS. 4A and 4B, the touch-sensing display device 20 includes a display panel 12, a touch panel 14, a driver unit 16, a first flexible printed circuit board 18a and a second flexible printed circuit board 18b. The driver unit 16 is disposed on the display panel 12 and provides driving signals to drive the display panel 12 and the touch panel 14. The first flexible printed circuit board 18a is electrically connected to the driver unit 16 and connects the display panel 12 to a first connector 22a, and the first connector 22a is connected to a system main board 24. Signal lines X1-Xm and Y1-Yn of the touch panel 14 are connected to the first flexible printed circuit board 18a through the first outer lead 28a of the touch panel 14, the second flexible printed circuit board 18b and the second connector 22b, and the routing of the first flexible printed circuit board 18a is connected to the driver unit 16 through the second outer lead 28b of the display panel 12. Besides, a cover glass 42 covers the touch panel 14, and the touch panel 14 may be formed on a glass carrier 48. In this embodiment, the driver unit 16 is, for example, a single driver IC with a touch-sensing function. The driver unit 16 provides driving signals for driving the display panel 12 and the touch panel 14 and includes a source channel 32, a gate channel 44 and a touch panel controller 34. The gate channel 44 may be divided into two parts, a left part of the gate channel 44 may drive odd-numbered gate lines, and a right part of the gate channel 44 may drive even-numbered gate lines.

Figure 5A:
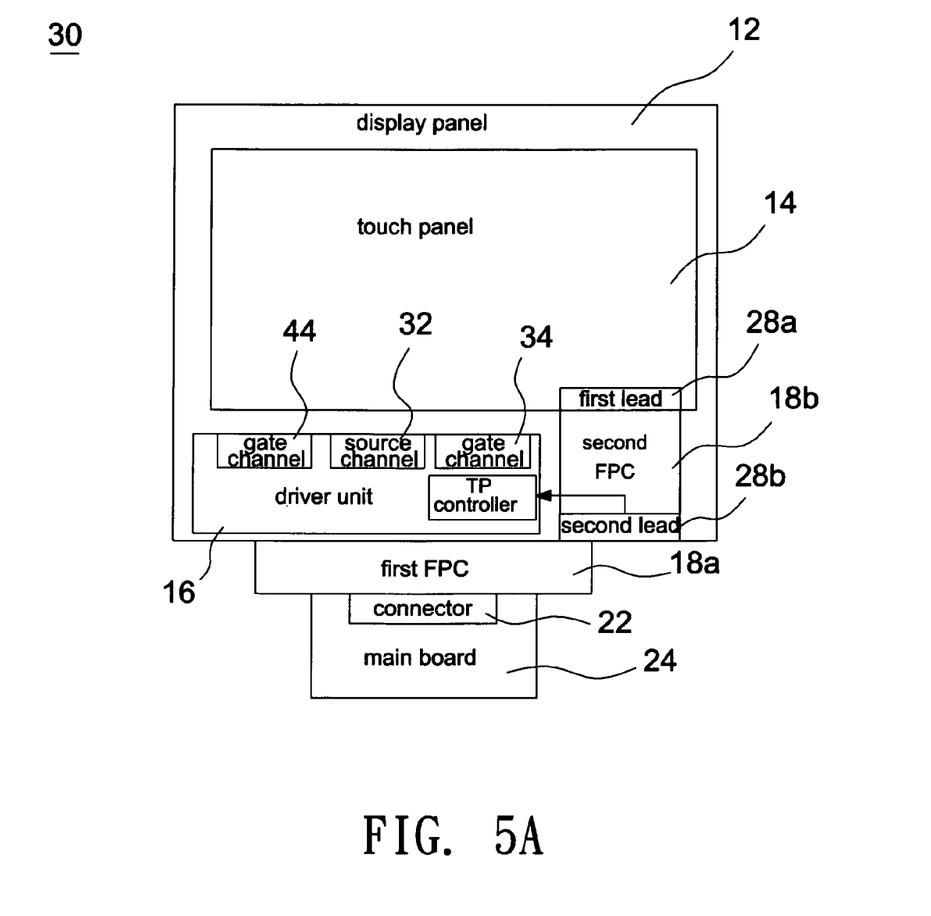
FIG. 5A shows a schematic diagram illustrating a touch-sensing display device according to another embodiment of the invention and FIG. 5B shows a partial cross-sectional schematic diagram of FIG. 5A.
Figure 5B:
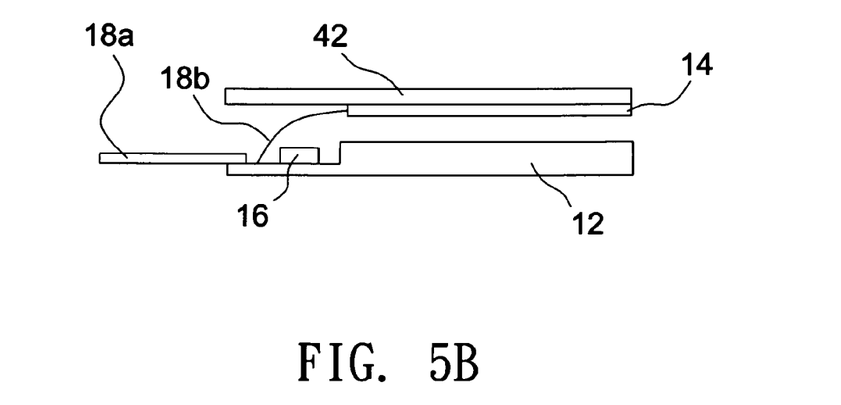

FIG. 5A shows a schematic diagram illustrating a touch-sensing display device 30 according to another embodiment of the invention, and FIG. 5B shows a partial cross-sectional schematic diagram of FIG. 5A. As shown in FIGS. 5A and 5B, the touch-sensing display device 30 includes a display panel 12, a touch panel 14, a driver unit 16, a first flexible printed circuit board 18a and a second flexible printed circuit board 18b. A cover glass 42 is disposed on one side of the display panel 12, and the touch panel 14 is formed on the cover glass 42. The driver unit 16 is disposed on the display panel 12 and provides driving signals to drive the display panel 12 and the touch panel 14. The first flexible printed circuit board 18a connects the display panel 12 to a connector 22, and the connector 22 is connected to a system main board 24. Signal lines of the touch panel 14 are connected to a second outer lead 28b of the display panel 12 through a first outer lead 28a of the touch panel 14 and the second flexible printed circuit board 18b, and the second outer lead 28b is connected to a touch panel controller 34 of the driver unit 16. In this embodiment, the driver unit 16 is, for example, a single driver IC with a touch-sensing function. The driver unit 16 includes a source channel 32, a gate channel 44 and a touch panel controller 34 to provide driving signals for driving the display panel 12 and the touch panel 14. The gate channel 44 may be divided into two parts, a left part of the gate channel 44 may drive odd-numbered gate lines, and a right part of the gate channel 44 may drive even-numbered gate lines.

Figure 6A:
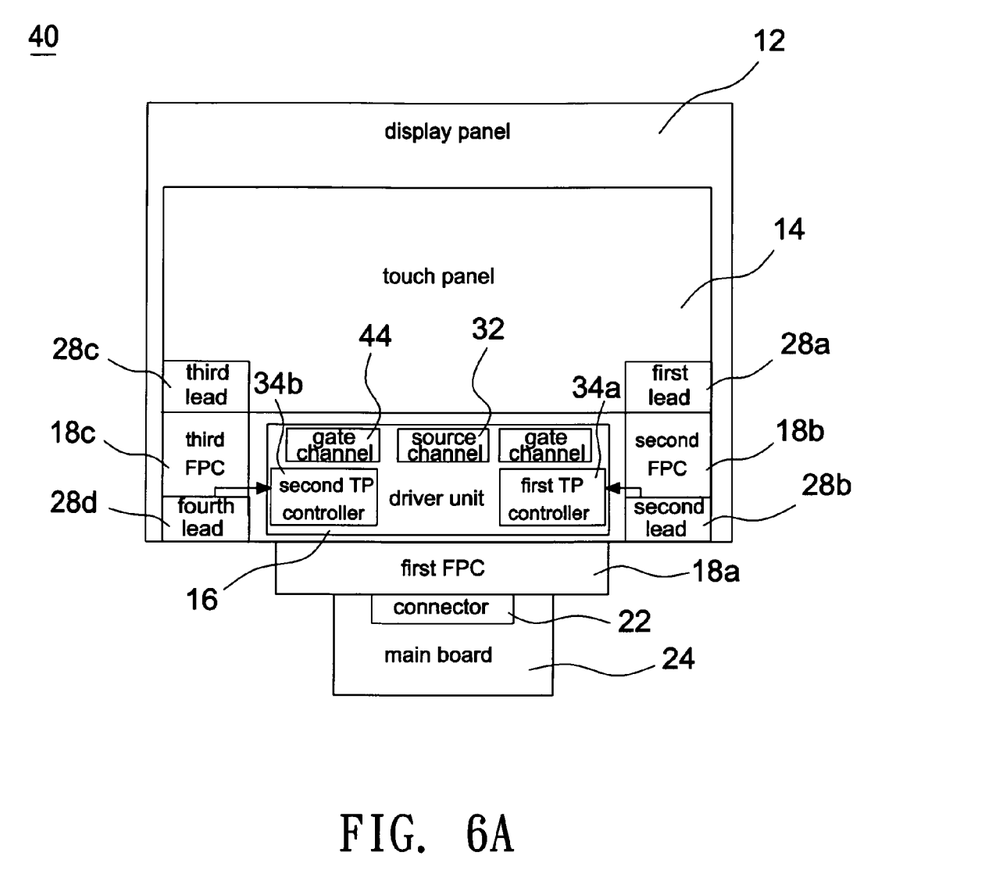
FIG. 6A shows a schematic diagram illustrating a touch-sensing display device according to another embodiment of the invention and FIG. 6B shows a partial cross-sectional schematic diagram of FIG. 6A.
Figure 6B:
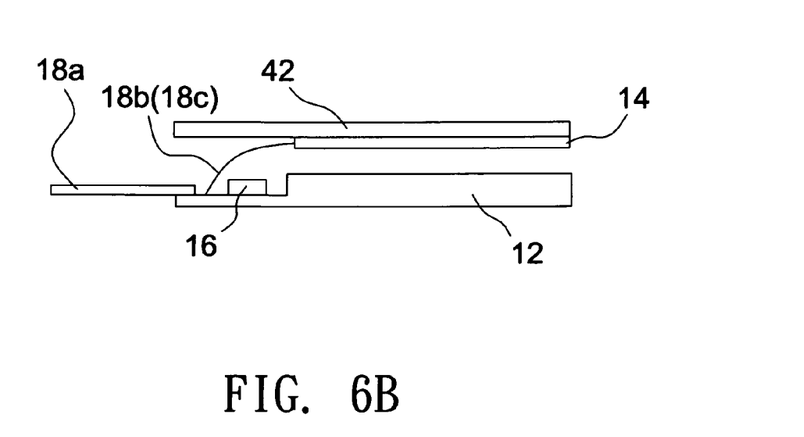

The touch-sensing display device 40 shown in FIGS. 6A and 6B is similar to the touch-sensing display device 30 shown in FIGS. 5A and 5B, except the driver unit 16 of the touch-sensing display device 40 includes a first touch panel controller 34a and a second touch panel controller 34b. A half of signal lines of the touch panel 14 are connected to the second outer lead 28b of the display panel 12 through the first outer lead 28a of the touch panel 14 and the second flexible printed circuit board 18b, and the second outer lead 28b is connected to the first touch panel controller 34a of the driver unit 16. The other half of signal lines of the touch panel 14 are connected to the fourth outer lead 28d of the display panel 12 through the third outer lead 28c of the touch panel 14 and the third flexible printed circuit board 18c, and the fourth outer lead 28d is connected to the second touch panel controller 34b of the driver unit 16.

Furthermore, in the above embodiments, the wiring configurations of the touch panel 14 and the display panel 12 can be exchanged with each other to also achieve the same effect of reducing noises and layout areas.

Besides, since the driver unit 16 has both the effects of driving a display panel and performing touch-sensing controls, the following will describe how to differentiate the functionalities of a source pad block SP, a gate pad block GP, a touch pad block TP, and a driver control signal pad block DP in the driver unit 16.

Figure 7:
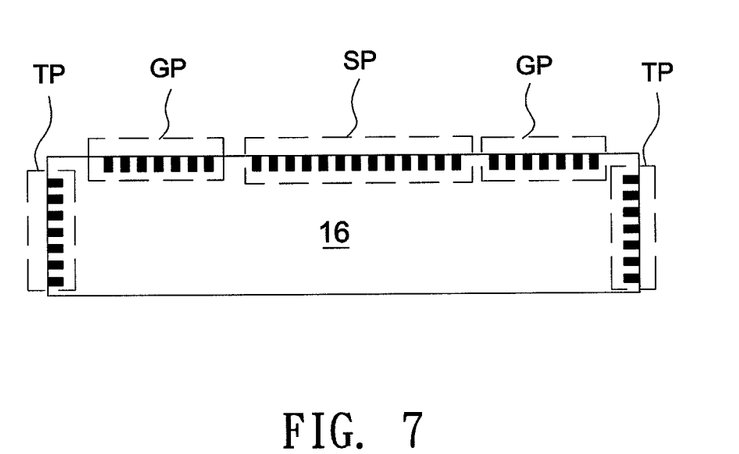
FIGS. 7-10 show distribution schematic diagrams of different pad blocks with different functions according to different embodiments of the invention.

As shown in FIG. 7, the source pad block SP and the gate pad block GP are disposed on a longitudinal side of the driver unit 16 and the touch pad blocks TP are disposed on two lateral sides (on the left-hand side and the right-hand side of the longitudinal side) of the driver unit 16. The pads in the touch pad blocks TP, the source pad block SP and the gate pad block GP may be arranged into a row. Therefore, the functionalities of the source pad block SP, the gate pad block GP and the touch pad blocks TP can be distinguished by the distribution positions on the driver unit 16.

Figure 8:
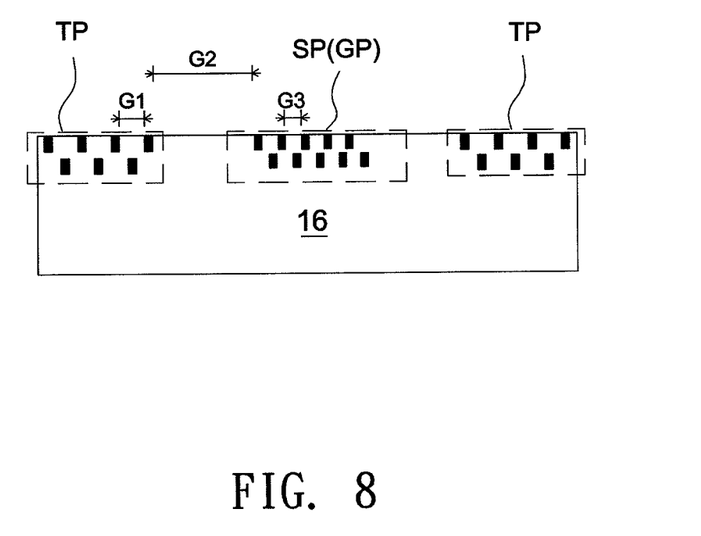

As shown in FIG. 8, the source pad block SP and the gate pad block GP are disposed on a longitudinal side of the driver unit 16, and the touch pad blocks TP are disposed towards the right-hand side or the left-hand side of the longitudinal side of the driver unit 16. The pads in the touch pad blocks TP, the source pad block SP and the gate pad block GP are arranged into two rows. In this embodiment, when a pitch between two adjacent pads in the touch pad block TP is G1, a pitch between two adjacent pads in the source pad block SP (or gate pad block GP) is G3, the distance between the touch pad blocks TP and the source pad block SP (gate pad block GP) is G2, it is designed to have $G1 \neq G2$ and $G3 \neq G2$ or designed to have $G1 \neq G2 \neq G3$. Therefore, the functionalities of blocks can be distinguished by the pitch of pads and the distance between blocks.

Figure 9:
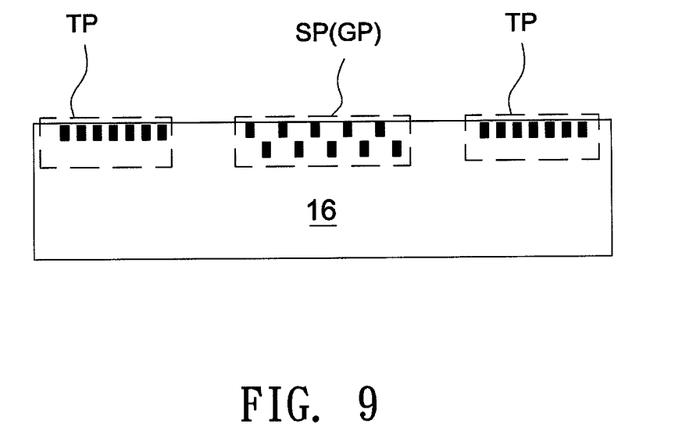

As shown in FIG. 9, the source pad block SP (or gate pad block GP) is disposed on a longitudinal side of the driver unit 16 and the touch pad blocks TP are disposed towards the right-hand side or the left-hand side of the longitudinal side of the driver unit 16. The pads in the touch pad blocks TP are arranged into one row, and the pads in the source pad block SP (or gate pad block GP) are arranged into two rows. Therefore, the functionalities of blocks can be distinguished by different arrangement of pads.

Figure 10:
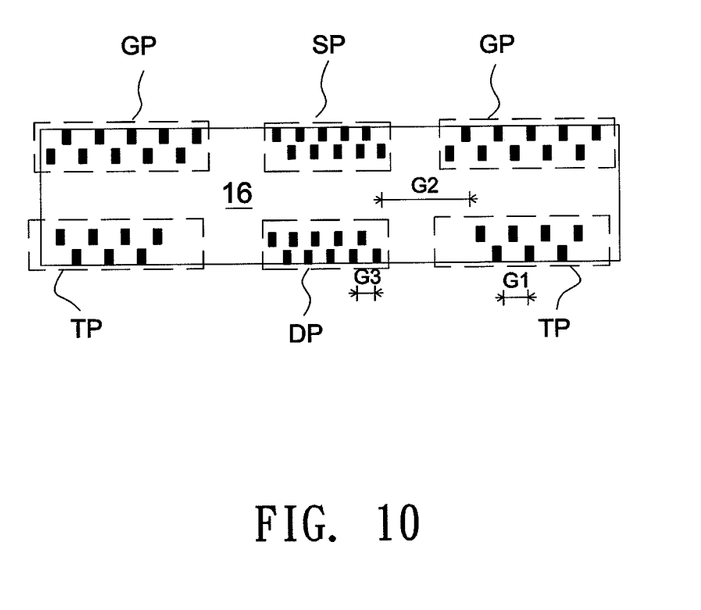

As shown in FIG. 10, the driver control signal pad block DP is disposed on a longitudinal side of the driver unit 16, and the touch pad blocks TP are disposed towards the left-hand side or the right-hand side of the longitudinal side of the driver unit 16. The pads in the touch pad blocks TP, the driver control signal pad block DP, the source pad block SP and the gate pad block GP are all arranged into two rows. In this embodiment, when a pitch between two adjacent pads in the touch pad block TP is G1, a pitch between two adjacent pads in the driver control signal pad block DP is G3, the distance between the driver control signal pad block DP and the touch pad blocks TP is G2, it is designed to have $G1 \neq G2$ and $G3 \neq G2$ or designed to have $G1 \neq G2 \neq G3$. Therefore, the functionalities of blocks can be distinguished by the pitch of pads and the distance between blocks.

In the above embodiments, the arrangement and the positions of pads in the pad block can be altered. Besides, the touch panel 14 in the above embodiments is only shown as an example but not limits the invention. Any touch-sensing element capable of performing touch-sensing controls can be applied to each embodiment of the invention. The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A touch-sensing display device, comprising:
   a display panel having a bottom glass and a gate driver formed on the bottom glass;
   a touch panel disposed on the display panel and having a plurality signal lines;
   a driver IC disposed on the bottom glass and providing driving signals to drive the display panel and the touch panel, wherein the driver IC comprises a source channel, a touch panel controller and control lines for the gate driver, the gate driver on the bottom glass is outside the driver IC, the source channel comprises at least one source pad block, the touch panel controller comprises at least one touch pad block, the source pad block having multiple source pads arranged to form a first pattern, the touch pad block having multiple touch pads arranged to form a second pattern, and the first pattern is different to the second pattern;

at least one connection pad formed on the bottom glass and interconnected with the driver IC, wherein the signal lines of the touch panel are electrically connected to the connection pad; and a flexible printed circuit board for connecting the display panel to a system main board.

2. The device as claimed in claim 1, wherein an arrangement of the multiple source pads in the source pad block is different to an arrangement of the multiple touch pads in the touch pad block.

3. The device as claimed in claim 1, wherein a pitch between two adjacent source pads in the source pad block is different to a pitch between two adjacent touch pads in the touch pad block.

4. A touch-sensing display device, comprising:

a display panel a bottom glass and a gate driver formed on the bottom glass;

a touch panel disposed on the display panel;

a driver IC disposed on the bottom glass and providing driving signals to drive the display panel and the touch panel, wherein the driver IC comprises a source channel, a touch panel controller and control lines for the gate driver, the gate driver on the bottom glass is outside the driver IC, the source channel comprises at least one source pad block, the touch panel controller comprises at least one touch pad block, the source pad block having multiple source pads arranged to form a first pattern, the touch pad block having multiple touch pads arranged to form a second pattern, and the first pattern is different to the second pattern;

at least one connection pad formed on the bottom glass and interconnected with the driver IC, wherein the signal lines of the touch panel are electrically connected to the connection pad;

a first flexible printed circuit board electrically connected to the driver unit driver IC for connecting the display panel to a system main board; and a second flexible printed circuit board for connecting the touch panel to the first flexible printed circuit board.

5. The device as claimed in claim 4, wherein the display panel is connected to the system main board through a first connector, the touch panel comprises a first outer lead, the display panel comprises a second outer lead, signal lines of the touch panel are connected to the first flexible printed circuit board through the first outer lead, the second flexible printed circuit board and a second connector, and the routing of the first flexible printed circuit board is connected to the driver IC through the second outer lead.

6. The device as claimed in claim 4, wherein an arrangement of the multiple touch pads in the touch pad block.

7. The device as claimed in claim 4, wherein a pitch between two adjacent source pads in the source pad block is different to a pitch between two adjacent touch pads in the touch pad block.

8. A touch-sensing display device, comprising:

a display panel;

a cover glass disposed on one side of the display panel;

a touch-sensing element formed on the cover glass;

a driver IC disposed on the display panel and providing driving signals to drive the display panel and the touch-sensing element, wherein the driver IC comprises at least one first pad block associated with a touch-sensing function and at least one second pad block associated with a display function, the first pad block having multiple first pads arranged to form a first pattern the second pad block having multiple second pads arranged to form a second pattern, and the first pattern is different to the second pattern; and a flexible printed circuit board for connecting the display panel to a system main board.

9. The device as claimed in claim 8, wherein the driver IC comprises a source channel, a gate channel and a touch-sensing controller.

10. The device as claimed in claim 8, wherein the touch-sensing element comprises a first outer lead, the display panel comprises a second outer lead, the second flexible printed circuit board is connected to the first outer lead and the second outer lead, and signal lines of the touch-sensing element are connected to the driver IC through the first outer lead, the second flexible printed circuit board and the second outer lead.

11. The device as claimed in claim 10, wherein the touch-sensing element further comprises a third outer lead, the display panel further comprises a fourth outer lead, the touch-sensing display device further comprises a third flexible printed circuit board for connecting the third outer lead and the fourth outer lead, a part of the signal lines of the touch-sensing element is connected to the driver IC through the first outer lead, the second flexible printed circuit board and the second outer lead, and the other part of the signal lines of the touch-sensing element is connected to the driver IC through the third outer lead, the third flexible printed circuit board and the fourth outer lead.

12. The device as claimed in claim 8, wherein an arrangement of the first pads in the first pad block is different to an arrangement of the second pads in the second pad block.

13. The device as claimed in claim 8, wherein a pitch between two adjacent first pads in the first pad block is different to a pitch between two adjacent second pads in the second pad block.

* * * * *